US012806684B2

(12) United States Patent
Poss et al.

(10) Patent No.: US 12,806,684 B2
(45) Date of Patent: Nov. 24, 2026

(54) METAL FOAM BODIES AND PROCESS FOR PRODUCTION THEREOF

(71) Applicant: EVONIK OPERATIONS GMBH, Essen (DE)

(72) Inventors: René Poss, Karlsruhe (DE); Monika Berweiler, Maintal (DE); Meike Roos, Büdingen (DE)

(73) Assignee: Evonik Operations GmbH, Essen (DE)

( * ) Notice: Subject to any disclaimer, the term of this patent is extended or adjusted under 35 U.S.C. 154(b) by 349 days.

(21) Appl. No.: 18/439,722

(22) Filed: Feb. 12, 2024

(65) Prior Publication Data

US 2024/0181527 A1 Jun. 6, 2024

Related U.S. Application Data

(62) Division of application No. 17/053,340, filed as application No. PCT/EP2020/076826 on Sep. 25, 2020, now Pat. No. 12,076,790.

(30) Foreign Application Priority Data

Sep. 25, 2019 (EP) .................................... 19199643

(51) Int. Cl.

*B22F 3/11* (2006.01)
*B01J 35/56* (2024.01)
*B22F 1/05* (2022.01)
*B22F 3/24* (2006.01)

(52) U.S. Cl.

CPC .............. *B22F 3/1137* (2013.01); *B22F 1/05* (2022.01); *B22F 3/1146* (2013.01); *B01J 35/56* (2024.01); *B22F 2003/242* (2013.01); *B22F 2003/248* (2013.01); *B22F 2301/052* (2013.01); *B22F 2303/30* (2013.01)

(58) Field of Classification Search

CPC ....................................... B22F 3/1121–3/1146
See application file for complete search history.

(56) References Cited

U.S. PATENT DOCUMENTS 4,049,580 A 9/1977 Oden et al.
4,491,564 A 1/1985 Gray
5,045,277 A 9/1991 Penkunas et al.
5,851,599 A 12/1998 Harada et al.
6,436,166 B2 8/2002 Arvidsson et al.
6,530,514 B2 3/2003 Shabtay
7,700,518 B2 4/2010 Wang et al.
8,758,675 B2 6/2014 Böhm et al.
10,596,556 B2 3/2020 Radivojevic et al.
10,675,682 B2 6/2020 Nakamura et al.
10,814,390 B2 10/2020 Skszek et al.
11,090,637 B2 8/2021 Wieland et al.
11,173,479 B2 11/2021 Schroeter et al.
11,260,375 B2 3/2022 Berweiler et al.
11,819,832 B2 11/2023 Roos et al.
12,076,790 B2 9/2024 Poss et al.
12,296,327 B2 5/2025 Poss et al.
12,427,508 B2 9/2025 Poss et al.
12,544,748 B2 2/2026 Poss et al.
2005/0275143 A1 12/2005 Toth
2008/0031767 A1 2/2008 Naumann et al.
2008/0171218 A1 7/2008 Naumann et al.
2011/0281723 A1 11/2011 Tsai et al.
2012/0141670 A1 6/2012 Walther et al.
2012/0329889 A1 12/2012 Yang et al.

(Continued)

FOREIGN PATENT DOCUMENTS

CN 1798717 7/2006
CN 101254466 9/2008

(Continued)

OTHER PUBLICATIONS

English language translation of the International Search Report for international application PCT/EP2020/076826, filed Sep. 25, 2020, corresponding to parent U.S. Appl. No. 17/053,340.

(Continued)

*Primary Examiner* — Sally A Merkling
*Assistant Examiner* — Austin Pollock
(74) *Attorney, Agent, or Firm* — Law Office of: Michael A. Sanzo, LLC

(57) ABSTRACT

The present invention relates to processes for producing metal foam bodies, in which metal-containing powders that may comprise aluminium and chromium or molybdenum are applied to metal foam bodies that may comprise nickel, cobalt, copper and iron and then treated thermally, wherein the highest temperature in the thermal treatment of the metal foam bodies is in the range from 680 to 715° C., and wherein the total duration of the thermal treatment within the temperature range from 680 to 715° C. is between 5 and 240 seconds. Following this method of thermal treatment can achieve alloy formation at the contact surface between metal foam body and metal-containing powder, but simultaneously leave unalloyed regions within the metal foam. The present invention further comprises processes comprising the treatment of the alloyed metal foam bodies with basic solution. The present invention further comprises the metal foam bodies obtainable by these processes, which find use, for example, as support and structure components and in catalyst technology.

17 Claims, No Drawings

(56) References Cited

U.S. PATENT DOCUMENTS

| | | | | |
|---|---|---|---|---|
| 2014/0221700 | A1* | 8/2014 | Radivojevic | B01J 25/02 502/301 |
| 2017/0141074 | A1 | 5/2017 | Schäfer et al. | |
| 2017/0167041 | A1 | 6/2017 | Poss et al. | |
| 2018/0010257 | A1 | 1/2018 | Braun et al. | |
| 2018/0230081 | A1 | 8/2018 | Rüfer et al. | |
| 2019/0210010 | A1 | 7/2019 | Pinkos et al. | |
| 2019/0232256 | A1 | 8/2019 | Berweiler et al. | |
| 2019/0232257 | A1 | 8/2019 | Weiland et al. | |
| 2019/0344248 | A1* | 11/2019 | Pinkos | C07C 29/172 |
| 2020/0016579 | A1 | 1/2020 | Schreiber et al. | |
| 2020/0269227 | A1* | 8/2020 | Schroeter | C07C 31/207 |
| 2021/0010146 | A1 | 1/2021 | Poss et al. | |
| 2021/0032185 | A1 | 2/2021 | Roos et al. | |
| 2021/0275996 | A1 | 9/2021 | Roos et al. | |
| 2021/0276091 | A1 | 9/2021 | Poss et al. | |
| 2022/0362757 | A1 | 11/2022 | Poss et al. | |
| 2022/0387986 | A1 | 12/2022 | Poss et al. | |
| 2022/0395816 | A1 | 12/2022 | Poss et al. | |
| 2023/0001388 | A1 | 1/2023 | Poss et al. | |
| 2024/0149261 | A1 | 5/2024 | Roos et al. | |
| 2024/0181527 | A1 | 6/2024 | Poss et al. | |

FOREIGN PATENT DOCUMENTS

| | | | | |
|---|---|---|---|---|
| CN | 101391222 | | 3/2009 | |
| CN | 101537360 | | 9/2009 | |
| CN | 101537361 | | 9/2009 | |
| CN | 101549297 | | 10/2009 | |
| CN | 101921924 | | 12/2010 | |
| CN | 102121090 | | 7/2011 | |
| CN | 106801159 | | 6/2017 | |
| CN | 109175382 | | 1/2019 | |
| DE | 102009015176 | | 7/2011 | |
| EP | 2 764 916 | | 8/2014 | |
| EP | 2883632 | A1 * | 6/2015 | C25D 5/10 |
| JP | 2002241102 | | 8/2002 | |
| JP | 2002241102 | A * | 8/2002 | |
| JP | 2005205265 | | 8/2005 | |
| JP | 2006-049595 | | 2/2006 | |
| KR | 101857435 | | 5/2018 | |
| WO | WO 95/11752 | | 5/1995 | |
| WO | WO 2015/028738 | | 3/2015 | |
| WO | WO 2021/058702 | | 4/2021 | |
| WO | WO 2021/058703 | | 4/2021 | |
| WO | WO 2021/058704 | | 4/2021 | |
| WO | WO 2021/058705 | | 4/2021 | |
| WO | WO 2021/058719 | | 4/2021 | |

OTHER PUBLICATIONS

English language translation of the Written Opinion of the International Searching Authority for international application PCT/EP2020/076826, filed Sep. 25, 2020, parent to copending U.S. Appl. No. 17/053,340.

International Preliminary Report on Patentability for international application PCT/EP2020/076826, filed Sep. 25, 2020, corresponding to parent U.S. Appl. No. 17/053,340.

European Search Report and Search Opinion for EP 19199643 filed Sep. 25, 2019, corresponding to PCT/EP2020/076826; with partial English language machine translation of the Search Opinion.

English language translation of the International Search Report for international application PCT/EP2020/076825, filed Sep. 25, 2020, corresponding to copending U.S. Appl. No. 17/762,732.

English language translation of the Written Opinion of the International Searching Authority for international application PCT/EP2020/076825, filed Sep. 25, 2020, corresponding to copending U.S. Appl. No. 17/762,732.

International Preliminary Report on Patentability for international application PCT/EP2020/076825, filed Sep. 25, 2020, corresponding to copending U.S. Appl. No. 17/762,732.

English language translation of the International Search Report for PCT/EP2020/076854, filed Sep. 25, 2020, corresponding to copending U.S. Appl. No. 17/762,730.

English language translation of the Written Opinion of the International Searching Authority for international application PCT/EP2020/076854, filed Sep. 25, 2020, corresponding to copending U.S. Appl. No. 17/762,730.

English language translation of the International Preliminary Report on Patentability for international application PCT/EP2020/076854, filed Sep. 25, 2020, corresponding to copending U.S. Appl. No. 17/762,730.

European Search Report and Search Opinion for EP 19199651 filed Sep. 25, 2019, corresponding to PCT/EP2020/076854 and PCT/EP2020/076825; with partial English language machine translation of the Search Opinion.

English language translation of the International Search Report for international application PCT/EP2020/076824, filed Sep. 25, 2020, corresponding to copending U.S. Appl. No. 17/762,848.

English language translation of the Written Opinion of the International Searching Authority for international application PCT/EP2020/076824, filed Sep. 25, 2020, corresponding to copending U.S. Appl. No. 17/762,848.

International Preliminary Report on Patentability for international application PCT/EP2020/076824, filed Sep. 25, 2020, corresponding to copending U.S. Appl. No. 17/762,848.

European Search Report and Search Opinion for EP 19199659 filed Sep. 25, 2019, corresponding to PCT/EP2020/076824; with partial English language machine translation of the Search Opinion.

English language translation of the International Search Report for international application PCT/EP2020/076822, filed Sep. 25, 2020, corresponding to copending U.S. Appl. No. 17/762,986.

Written Opinion of the International Searching Authority for international application PCT/EP2020/076822, filed Sep. 25, 2020, corresponding to copending U.S. Appl. No. 17/762,986.

International Preliminary Report on Patentability for international application PCT/EP2020/076822, filed Sep. 25, 2020, corresponding to copending U.S. Appl. No. 17/762,986.

European Search Report and Search Opinion for EP 19199638 filed Sep. 25, 2019, corresponding to international application PCT/EP2020/076822; with partial English language machine translation of the Search Opinion.

International Search Report for international application PCT/EP2022/056426, filed Mar. 14, 2022, corresponding to copending U.S. Appl. No. 18/283,156.

Revised version of the International Search Report for international application PCT/EP2022/056426, filed Mar. 14, 2022, corresponding to copending U.S. Appl. No. 18/283,156.

Written Opinion of the International Searching Authority for international application PCT/EP2022/056426, filed Mar. 14, 2022, corresponding to copending U.S. Appl. No. 18/283,156.

Revised version of the Written Opinion of the International Searching Authority for international application PCT/EP2022/056426, filed Mar. 14, 2022, corresponding to copending U.S. Appl. No. 18/283,156.

International Preliminary Report on Patentability for international application PCT/EP2022/056426, filed Mar. 14, 2022, corresponding to copending U.S. Appl. No. 18/283,156.

European Search Report and Search Opinion for EP 21164243 filed Mar. 23, 2021, corresponding to PCT/EP2022/056426; with partial English language machine translation of the Search Opinion.

Chang, et al., "A thermally self-sustaining solid oxide fuel cell system at ultra-lo operating temperature (319 C)," *Energy 104(20)*:107-113 (Apr. 2016).

Rausch, et al., "Morphology and Utilization of Smooth Hydrogen-Evolving Raney Nickel Cathode Coatings and Porous Sintered-Nickel Cathodes," *J. Electrochem. Soc. 143(9)*:2852-2862 (Sep. 1996).

Wen-Wen, et al., "Synthesis and Compression Property of Oxidation-Resistant Ni—Al Foams," *Acta. Metall. Sin. 30(1)*:965-972 (Mar. 2017).

(56) References Cited

OTHER PUBLICATIONS

Yashnik, et al., "High-Performance Mn—Al—O Catalyst on Reticulated Foam Materials for Environmentally Friendly Catalytic Combustion," *Eurasian Chemico-Technological Journal 17*(*2*):145-158 (Jan. 2015).
Ullman's Encyclopedia of Industrial Chemistry, "Metallic Foams" chapter, published online on Jul. 15, 2012, DOI: 25 10.1002/14356007.c16_c01.pub2.
U.S. Appl. No. 17/762,730, filed Mar. 23, 2022, US-2022/0362757 A1, Nov. 17, 2022, Poss.
U.S. Appl. No. 17/762,732, filed Mar. 23, 2022, US-2022/0395816 A1, Dec. 15, 2022, Poss.
U.S. Appl. No. 17/762,848, filed Mar. 23, 2022, US-2023/0001388 A1, Jan. 5, 2023, Poss.
U.S. Appl. No. 17/762,986, filed Mar. 23, 2022, US-2022/0387986 A1, Dec. 8, 2022, Poss.
U.S. Appl. No. 18/283,156, filed Sep. 20, 2023, Roos.
U.S. Appl. No. 17/053,340, filed Nov. 5, 2020, US-2021/0276091 A1, Sep. 9, 2021, Poss.

* cited by examiner

METAL FOAM BODIES AND PROCESS FOR PRODUCTION THEREOF

CROSS REFERENCE TO RELATED APPLICATIONS

The present application is a division of U.S. Ser. No. 17/053,340 which had a 371 date of Nov. 5, 2020, and which is US national stage of international application PCT/EP2020/076826, which has an international filing date of Sep. 25, 2020 and which claims priority to EP 19199643.8, filed in Europe on Sep. 25, 2019. The contents of these prior applications is hereby incorporated by reference in its entirety.

BACKGROUND

The present invention relates to processes for producing shaped bodies from metal, which comprise the providing of a metal foam body composed of two metallic components, the subsequent applying of metal-containing powders, and a final thermal treatment for alloy formation. A suitable temperature regime for the thermal treatment and selection of the metals involved enables limiting of alloy formation to the upper layers of the metal foam, such that unalloyed regions remain in central regions of the metal foam. The present invention further relates to processes in which the thermal treatment for alloy formation is followed by a treatment with a basic solution. One field of use for processes of this kind is in the production of catalysts. The present invention further relates to the metal foam bodies obtainable by the processes according to the invention that find use, for example, as support and structure components and in catalyst technology.

PRIOR ART

Processes for producing metal foam bodies are known from the prior art, for example from WO2019057533A1. Metal powders are applied therein to metal bodies in foam form and are subsequently treated thermally so as to form alloys in the contact region of metal body in foam form and metal powder. WO2019057533A1 discloses a multitude of metals and metal combinations that may be chosen for the metal body in foam form and the metal powder, and also general details for the performance of the thermal treatment for alloy formation and some specific examples for treatment of aluminium powder on nickel foam.

The extent of alloy formation depends on the conditions of the thermal treatment: A thermal treatment at high temperatures leads to alloy formation in deeper regions of the metal foam, while a thermal treatment at lower temperatures leads only to alloy formation in the upper regions of the metal foam, leaving unalloyed regions within the metal foam. Moreover, the selection of the metals of the metal body in foam form and of the metal powder has a great influence on alloy formation.

Since it is of great significance that unalloyed regions remain in the metal foam for numerous applications of corresponding metal foams, there is a need for processes that ensure this. The processes of the present invention meet this need.

DESCRIPTION OF THE INVENTION

Processes according to the invention for producing metal foam bodies comprise the following steps:

(a) providing a metal foam body A consisting of two metallic components, where these metallic components may be in the form either of (i) an alloy or (ii) an arrangement of two superposed layers of the two individual metallic components, in which case one of the metallic components forms the inner layer of the metal foam and the other metallic component the outer layer of the metal foam,
  - wherein, in the case of alternative (i), the metallic components in the form of an alloy are selected from the list of the following combinations: nickel and cobalt, nickel and copper,
  - wherein, in the case of alternative (ii), the metallic components are selected from the list of the following combinations: nickel on the inside and cobalt on the outside, nickel on the inside and copper on the outside, iron on the inside and nickel on the outside, and (b) applying a metal-containing powder MP to metal foam body A so as to obtain metal foam body AX,
  - wherein the metal-containing powder MP is either a mixture of aluminium powder and chromium powder or a mixture of aluminium powder and molybdenum powder or a pulverulent alloy composed of aluminium and chromium, or a pulverulent alloy composed of aluminium and molybdenum, (c) treating metal foam body AX thermally in order to achieve alloy formation between the metallic components of metal foam body A and the metal-containing powder MP so as to obtain metal foam body B,
  - wherein the highest temperature of the thermal treatment of metal foam body AX is in the range from 680 to 715° C.,
  - and wherein the total duration of the thermal treatment in the temperature range from 680 to 715° C. is between 5 and 240 seconds.

Experimental results that have been obtained in connection with the present invention show that the choice of conditions for the thermal treatment for alloy formation has a considerable influence on the result, especially the selection of the metals in metal foam and metal powder and the temperature conditions. The processes according to the invention allow limiting of alloy formation to the upper layers of the metal foam in the case of the metal combinations mentioned, such that unalloyed regions remain in central regions of the metal foam. The presence of these unalloyed regions affects properties including the chemical and mechanical stability of the resultant metal foam.

In connection with the present invention, a metal foam body A is understood to mean a metal body in foam form. Metal bodies in foam form are disclosed, for example, in Ullmann's Encyclopedia of Industrial Chemistry, section "Metallic Foams", published online on 15 Jul. 2012, DOI: 10.1002/14356007.c16_c01.pub2. Suitable metal foams are in principle those having different morphological properties with regard to pore size and shape, layer thickness, area density, geometric surface area, porosity, etc. Preferably, metal foam A has a density in the range from 400 to 1500 $g/m^2$, a pore size of 400 to 3000 μm, preferably of 400 to 800 μm, and a thickness in the range from 0.5 to 10 mm, preferably of 1.0 to 5.0 mm. Preparation can be effected in a manner known per se. For example, a foam made of an organic polymer may be coated successively or simultaneously with two metal components and then the polymer removed by thermolysis, yielding a metal foam. For coating with at least one first metal or a precursor thereof, the foam made of the organic polymer may be contacted with a solution or suspension containing the first metal. This may be done for example by spraying or dipping. Deposition by means of chemical vapour deposition (CVD) is also possible. For example, a polyurethane foam may be coated successively with two metals and then the polyurethane foam thermolysed. A polymer foam suitable for producing shaped bodies in the form of a foam preferably has a pore size within the range from 100 to 5000 μm, more preferably from 450 to 4000 μm and especially from 450 to 3000 μm. A suitable polymer foam preferably has a layer thickness of 5 to 60 mm, more preferably of 10 to 30 mm. A suitable polymer foam preferably has a density of 300 to 1200 $kg/m^3$. The specific surface area is preferably within a range from 100 to 20 000 $m^2/m^3$, more preferably 1000 to 6000 $m^2/m^3$. The porosity is preferably within a range from 0.50 to 0.95.

The metal foam bodies A used in step (a) of the process according to the invention may have any desired shape, for example cubic, cuboidal, cylindrical, etc. The metal foam bodies may alternatively be formed to monoliths, for example.

The metal-containing powder MP may be applied in various ways in step (b) of the process according to the invention, for example by contacting metal foam body A with a composition of the metal-containing powder MP by rolling or dipping, or by applying a composition of the metal-containing powder MP by spraying, scattering or pouring. For this purpose, the composition of the metal-containing powder MP may be in the form of a suspension or in the form of a powder.

Preferably, the actual applying of the composition of the metal-containing powder MP to metal foam body A in step (b) of the process according to the invention is preceded by prior impregnation of metal foam body A with a binder. The impregnating can be effected, for example, by spraying the binder or dipping of metal foam body A into the binder, but is not limited to these options. It is then possible to apply the composition of the metal-containing powder MP to the metal foam body A thus prepared.

Alternatively, it is possible to apply binder and composition of the metal-containing powder MP in one step. For this purpose, either the composition of the metal-containing powder MP is suspended in the liquid binder itself prior to the applying or the composition of the metal-containing powder MP and the binder are suspended in an auxiliary liquid F.

The binder is a composition that can be converted completely to gaseous products by thermal treatment within the temperature range from 100 to 400° C., comprising an organic compound that promotes adhesion of the composition of the metal-containing powder MP on the metal foam body. The organic compound is preferably selected from the following group: polyethyleneimines (PEI), polyvinylpyrrolidone (PVP), ethylene glycol, mixtures of these compounds. Particular preference is given to PEI. The molecular weight of the polyethyleneimine is preferably within a range from 10 000 to 1 300 000 g/mol. The molecular weight of the polyethyleneimine (PEI) is preferably within a range from 700 000 to 800 000 g/mol.

Auxiliary liquid F must be capable of suspending the composition of the metal-containing powder MP and the binder and be fully convertible to gaseous products by thermal treatment in the temperature range from 100 to 400° C. Preferably, auxiliary liquid F is selected from the following group: water, ethylene glycol, PVP and mixtures of these compounds. Typically, when auxiliary liquid is used, the binder is suspended in water at a concentration in the range from 1% to 10% by weight, then the composition of the metal-containing powder MP is suspended in this suspension.

The metal-containing powder MP used in step (b) of the process according to the invention may, as well as pulverulent metal components, also contain additions that contribute to increasing flowability or water stability. Such additions must be fully convertible to gaseous products by thermal treatment in the temperature range from 100 to 400° C. The metal-containing powder MP used in step (b) of the process according to the invention comprises one or more pulverulent metal components selected from the following group: mixtures of aluminium powder and chromium powder, mixtures of aluminium powder and molybdenum powder, pulverulent alloy of aluminium and chromium, pulverulent alloy of aluminium and molybdenum. Preferably, the metal-containing powder MP used in step (b) of the process according to the invention comprises, as the sole metal component, either (i) a mixture of aluminium powder and chromium powder or (ii) a pulverulent alloy of aluminium and chromium. More preferably, the metal-containing powder MP used in step (b) of the process according to the invention comprises, as the sole metal component, a pulverulent alloy of aluminium and chromium.

The composition of the metal-containing powder MP preferably has a metal component content in the range from 80% to 99.8% by weight. Preference is given here to compositions in which the metal component particles have a particle size of not less than 5 μm and not greater than 200 μm. Particular preference is given to compositions in which 95% of the metal component particles have a particle size of not less than 5 μm and not greater than 75 μm. It may be the case that the composition, as well as the metal component in elemental form, also contains metal component in oxidized form. This oxidized component is typically in the form of oxidic compounds, for example oxides, hydroxides and/or carbonates. The proportion by mass of the oxidized component is typically in the range from 0.05% to 10% by weight of the total mass of the metal powder composition.

In step (c) of the process according to the invention, thermal treatment is effected in order to achieve the formation of one or more alloys.

Experimental results that have been obtained in connection with the present invention show that the selection of the metals in metal foam body A and metal-containing powder MP has a considerable influence on the progression of alloy formation. The results also show that relatively strict temperature control is necessary in order to restrict alloy formation to the upper regions of the metal foam and to leave unalloyed regions within the metal foam.

In step (c) of the process according to the invention, metal foam body AX is treated thermally in order to achieve alloy formation between the metallic components of metal foam body A and the metal-containing powder MP, such that metal foam body B is obtained, where the highest temperature of the thermal treatment of metal foam body AX is in the range from 680 to 715° C., and where the total duration of the thermal treatment in the temperature range from 680 to 715° C. is between 5 and 240 seconds.

The thermal treatment comprises the heating, typically in a stepwise manner, of the metal foam body AX and subsequent cooling to room temperature. The thermal treatment takes place under inert gas or under reductive conditions. Reductive conditions are understood to mean the presence of a gas mixture containing hydrogen and at least one gas which is inert under the reaction conditions; a suitable example is a gas mixture containing 50% by volume of N2 and 50% by volume of H2. The inert gas used is preferably nitrogen. The heating can be effected, for example, in a conveyor furnace. Suitable heating rates are in the range from 10 to 200 K/min, preferably 20 to 180 K/min. During the thermal treatment, the temperature is typically first increased from room temperature to about 300 to 400° C. and moisture and organic constituents are removed from the coating at this temperature for a period of about 2 to 30 minutes, then the temperature is increased to the range from 680 to 715° C. until an alloy is formed between metallic components of metal foam body AX and the composition of the metal-containing powder MP, and then the metal foam body is quenched by contact with protective gas environment at a temperature of about 200° C.

In order to limit alloy formation to the upper regions of the metal foam in the case of the metals involved in accordance with the invention, and to leave unalloyed regions within the metal foam, it is necessary for the highest temperature of the thermal treatment of metal foam body AX in step (c) to be in the range from 680 to 715° C., and also for the total duration of the thermal treatment within the temperature range from 680 to 715° C. to be between 5 and 240 seconds. To a certain degree, the duration of the thermal treatment can compensate for the level of the highest treatment temperature and vice versa, but it is found that the frequency of the experiments in which alloy formation in the upper region of the metal foam is achieved while simultaneously leaving unalloyed regions within the metal foam decreases significantly when the highest temperature of the thermal treatment leaves the temperature interval between 680 and 715° C. and/or the duration of the thermal treatment within the temperature interval between 680 and 715° C. is outside the range from 5 to 240 seconds. Too high a maximum temperature and/or presence of the metal foam body in the region of the maximum temperature for an excessively long period have the effect that alloy formation advances down to the lowest depths of the metal foam and no unalloyed regions remain. Too low a maximum temperature and/or presence of the metal foam body in the region of the maximum temperature for too short a period have the effect that alloy formation does not commence at all. The result of selection of materials other than the metals involved in accordance with the invention for metal foam body A and metal-containing powder MP may likewise be that, in spite of a thermal treatment in the temperature interval between 680 and 715° C. for a period of 5 to 240 seconds, either no alloy formation is obtained or no unalloyed regions remain within the foam.

In a preferred embodiment, the mass ratio of the two metallic components in metal foam body A is in the range from 1:1 to 20:1, the ratio of the mass of aluminium to the mass of all other metallic components in the metal-containing powder MP is also in the range from 4:1 to 50:1, and the ratio V of the masses of metal foam body B to metal foam body A, V=m(metal foam body B)/m(metal foam body A), is also in the range from 1.1:1 to 1.5:1.

In a further preferred embodiment, the mass ratio of the two metallic components in metal foam body A is in the range from 1:1 to 10:1, the ratio of the mass of aluminium to the mass of all other metallic components in the metal-containing powder MP is also in the range from 10:1 to 20:1, and the ratio V of the masses of metal foam body B to metal foam body A, V=m(metal foam body B)/m(metal foam body A), is also in the range from 1.2:1 to 1.4:1.

In a further aspect, the present invention further comprises processes having the following step (d): treating the metal foam body B with a basic solution. The treatment of the metal foam body B with a basic solution may serve to at least partly dissolve metal components of the composition of the metal-containing powder MP applied and alloys between metallic components of metal foam body and the composition of the metal-containing powder MP, and in that way to remove them from the metal foam body. Typically, the treatment with basic solution removes 30% to 70% by weight of the total mass of the metal components of the composition of the metal-containing powder MP applied and of the alloys between metallic components of metal foam body and composition of the metal-containing powder MP from the metal foam bodies. Basic solutions used are typically aqueous basic solutions of NaOH, KOH, LiOH or mixtures thereof. The temperature in the basic treatment is typically kept within the range from 25 to 120° C. The duration of the treatment with basic solution is typically in the range from 5 minutes to 8 hours. Given suitable choice of the metallic components, it is possible to use metal foam bodies that are obtained as a result of the treatment with basic solution as catalysts, as disclosed, for example, in WO2019057533A1.

In a preferred embodiment, the treatment of the metal foam body B with a basic solution is performed for a period in the range from 5 minutes to 8 hours at a temperature in the range from 20 to 120° C., wherein the basic solution is an aqueous NaOH solution having an NaOH concentration between 2% and 30% by weight.

In a further aspect, the present invention further encompasses coated metal foam bodies obtainable by one of the processes according to the invention.

In a further preferred embodiment, the present invention further relates to processes and the metal foam bodies obtainable thereby, in which the two metallic components are present in the form of an arrangement of two superposed layers of individual metals in metal foam body A, and wherein nickel forms the inner layer and cobalt the outer layer, and in which, in step (d), metal foam body B is treated with a basic solution.

In a further preferred embodiment, the present invention further relates to processes and the metal foam bodies obtainable thereby, in which nickel and cobalt are present in the form of an alloy in metal foam body A, and in which, in step (d), metal foam body B is treated with a basic solution.

In a further preferred embodiment, the present invention further relates to processes and the metal foam bodies obtainable thereby, in which the metal-containing powder MP used in step (b) comprises, as the sole metal component, either (i) a mixture of aluminium powder and chromium powder, or (ii) a pulverulent alloy of aluminium and chromium, and in which, in step (d), metal foam body B is treated with a basic solution.

In a further preferred embodiment, the present invention further relates to processes and the metal foam bodies obtainable thereby, in which the metal-containing powder MP used in step (b) comprises, as the sole metal component, a pulverulent alloy of aluminium and chromium, and in which, in step (d), metal foam body B is treated with a basic solution.

In a further preferred embodiment, the present invention further relates to processes and the metal foam bodies obtainable thereby, in which the two metallic components are present in the form of an arrangement of two superposed layers of individual metals in metal foam body A, and wherein nickel forms the inner layer and cobalt the outer layer, and in which the metal-containing powder MP used in step (b) comprises, as the sole metal component, either (i) a mixture of aluminium powder and chromium powder, or (ii) a pulverulent alloy of aluminium and chromium.

umfasst.

In a further preferred embodiment, the present invention further relates to processes and the metal foam bodies obtainable thereby, in which the two metallic components are present in the form of an arrangement of two superposed layers of individual metals in metal foam body A, and wherein nickel forms the inner layer and cobalt the outer layer, and in which the metal-containing powder MP used in step (b) comprises, as the sole metal component, either (i) a mixture of aluminium powder and chromium powder, or (ii) a pulverulent alloy of aluminium and chromium.

and in which, in step (d), metal foam body B is treated with a basic solution.

In a further preferred embodiment, the present invention further relates to processes and the metal foam bodies obtainable thereby, in which the two metallic components are present in the form of an arrangement of two superposed layers of individual metals in metal foam body A, and wherein nickel forms the inner layer and cobalt the outer layer, and in which the metal-containing powder MP used in step (b) comprises, as the sole metal component, a pulverulent alloy of aluminium and chromium.

In a further preferred embodiment, the present invention further relates to processes and the metal foam bodies obtainable thereby, in which the two metallic components are present in the form of an arrangement of two superposed layers of individual metals in metal foam body A, and wherein nickel forms the inner layer and cobalt the outer layer, and in which the metal-containing powder MP used in step (b) comprises, as the sole metal component, a pulverulent alloy of aluminium and chromium, and in which, in step (d), metal foam body B is treated with a basic solution.

In a further preferred embodiment, the present invention further relates to processes and the metal foam bodies obtainable thereby, in which nickel and cobalt are present in the form of an alloy in metal foam body A, and in which the metal-containing powder MP used in step (b) comprises, as the sole metal component, either (i) a mixture of aluminium powder and chromium powder, or (ii) a pulverulent alloy of aluminium and chromium.

umfasst.

In a further preferred embodiment, the present invention further relates to processes and the metal foam bodies obtainable thereby, in which nickel and cobalt are present in the form of an alloy in metal foam body A, and in which the metal-containing powder MP used in step (b) comprises, as the sole metal component, either (i) a mixture of aluminium powder and chromium powder, or (ii) a pulverulent alloy of aluminium and chromium.

and in which, in step (d), metal foam body B is treated with a basic solution.

In a further preferred embodiment, the present invention further relates to processes and the metal foam bodies obtainable thereby, in which nickel and cobalt are present in the form of an alloy in metal foam body A, and in which the metal-containing powder MP used in step (b) comprises, as the sole metal component, a pulverulent alloy of aluminium and chromium.

In a further preferred embodiment, the present invention further relates to processes and the metal foam bodies obtainable thereby, in which nickel and cobalt are present in the form of an alloy in metal foam body A, and in which the metal-containing powder MP used in step (b) comprises, as the sole metal component, a pulverulent alloy of aluminium and chromium, and in which, in step (d), metal foam body B is treated with a basic solution.

EXAMPLES

1. Providing of Metal Foam Bodies

Three metal foam bodies (a, b, c) of a cobalt-nickel alloy were provided (Co/Ni=9:1) (manufacturer: AATM, dimensions: 220 mm×180 mm×1.6 mm, weight per unit area: 1000 $g/m^2$, average pore diameter: 580 μm), which had been produced by simultaneous electrolytic deposition of nickel and cobalt on a polyurethane foam and subsequent thermolysis of the plastic components.

2. Applying of Metal-Containing Powders

Subsequently, binder solution (polyethyleneimine (2.5% by weight) in water) was first sprayed onto all metal foam bodies, and then a pulverulent aluminium-chromium alloy (manufacturer: AMG, average particle size: <63 μm, Al/Cr=70/30, with 3% by weight of added ethylenebis (stearamide)) was applied as a dry powder (about 400 $g/m^2$).

3. Thermal Treatment

Thereafter, all metal foam bodies were subjected to a thermal treatment under nitrogen atmosphere in a furnace. First of all, the furnace was heated from room temperature to the maximum temperature within about 15 min, which was maintained for a defined period of time, followed by quenching by contacting with nitrogen atmosphere at 200° C.

Maximum Temperature for Metal Foam Body a:
700° C. for 2 minutes

Temperature Progression for Metal Foam Body b:
600° C. for 2 minutes

Temperature Progression for Metal Foam Body c:
750° C. for 2 minutes

4. Determination of Extent of Alloying

At the end, the extent of alloy formation in the metal foam bodies was determined. For this purpose, cross sections of the metal foam bodies were examined under the microscope and scanning electron microscope.

This gave the following result:

While superficial alloy formation had taken place in metal foam body a, but unalloyed regions remained within the metal foam, no alloy formation took place in the case of metal foam body b, and alloy formation in metal foam body c is so far advanced that no unalloyed regions remained within the metal foam.

This result clearly shows that departure from the thermal treatment conditions according to the invention has the effect that superficial alloy formation leaving unalloyed regions within the metal foam is difficult to achieve.

The invention claimed is:

1. A process for producing a metal foam body, comprising the following steps:

(a) providing a metal foam body A, comprising two metallic components, wherein the metallic components are in the form of an arrangement of two superposed layers of the two individual metallic components, wherein one of the metallic components forms the inner layer of the metal foam and the other metallic component forms the outer layer of the metal foam, and the metallic components are selected from the combinations consisting of: nickel on the inside and cobalt on the outside; nickel on the inside and copper on the outside; and iron on the inside and nickel on the outside;

(b) applying a metal-containing powder MP to metal foam body A so as to obtain metal foam body AX, wherein the metal-containing powder MP is selected from the group consisting of: a mixture of aluminium powder and chromium powder; a mixture of aluminium powder and molybdenum powder; a pulverulent alloy comprising aluminium and chromium; and a pulverulent alloy comprising aluminium and molybdenum;

(c) treating metal foam body AX thermally in order to achieve alloy formation between the metallic components of metal foam body A and the metal-containing powder MP so as to obtain metal foam body B, wherein:

the highest temperature of the thermal treatment of metal foam body AX is in the range from 680 to 715° C.; and the total duration of the thermal treatment in the temperature range of from 680 to 715° C. is between 5 and 240 seconds;

wherein, after step c), alloy formation is found in the upper regions of the metal foam, but unalloyed regions remain within central areas of the metal foam;

wherein, the metal-containing powder MP is applied to the metal foam body A using a polyethyleneimine binder with a molecular weight in the range of 700 000 to 800 000 g/mol;

wherein, the binder is completely converted to gas at a temperature of 100-400° C.; and wherein MP and binder are applied to A in one step as a suspension comprising MP and binder.

2. The process of claim 1, wherein metal foam body A comprises nickel on the inside and copper on the outside.

3. The process of claim 1, wherein metal foam body A comprises iron on the inside and nickel on the outside.

4. The process of claim 1, wherein the metal-containing powder MP used in step (b) comprises either:

(iii) a mixture of aluminium powder and chromium powder; or (iv) a pulverulent alloy of aluminium and chromium.

5. The process of claim 1, wherein the metal-containing powder MP used in step (b) comprises a pulverulent alloy of aluminium and chromium.

6. The process of claim 1, wherein:

the mass ratio of the two metallic components in metal foam body A is in the range from 1:1 to 20:1;

the ratio of the mass of aluminium to the mass of chromium or of molybdenum in the metal-containing powder MP is in the range from 4:1 to 50:1; and the ratio V of the masses of metal foam body B to metal foam body A, V=m(metal foam body B)/m(metal foam body A), is in the range from 1.1:1 to 1.5:1.

7. The process of claim 1, wherein metal foam body A comprises nickel on the inside and cobalt on the outside.

8. The process of claim 7, further comprising the step:

(d) treating the metal foam body B with a basic solution.

9. The process of claim 8, wherein the treatment of the metal foam body B with a basic solution is performed for a period in the range from 5 minutes to 8 hours at a temperature in the range from 20 to 120° C., and wherein the basic solution is an aqueous NaOH solution having an NaOH concentration between 2% and 30% by weight.

10. The process of claim 1, wherein the metal foam body A consists of two metallic components in the form of an arrangement of two superposed layers of the two individual metallic components, wherein one of the metallic components forms the inner layer of the metal foam and the other metallic component forms the outer layer of the metal foam and wherein the metallic components consist of: nickel on the inside and cobalt on the outside; nickel on the inside and copper on the outside; or iron on the inside and nickel on the outside.

11. The process of claim 10, wherein metal foam body A consists of nickel on the inside and cobalt on the outside.

12. The process of claim 10, wherein metal foam body A consists of nickel on the inside and copper on the outside.

13. The process of claim 10, wherein metal foam body A consists of iron on the inside and nickel on the outside.

14. The process of claim 10, wherein:

the mass ratio of the two metallic components in metal foam body A is in the range from 1:1 to 20:1;

the ratio of the mass of aluminium to the mass of chromium or of molybdenum in the metal-containing powder MP is in the range from 4:1 to 50:1; and the ratio V of the masses of metal foam body B to metal foam body A, V=m(metal foam body B)/m(metal foam body A), is in the range from 1.1:1 to 1.5:1.

15. The process of claim 10, wherein the metal-containing powder MP used in step (b) comprises either:

(iii) a mixture of aluminium powder and chromium powder; or (iv) a pulverulent alloy of aluminium and chromium.

16. The process of claim 10, further comprising the step:

(d) treating the metal foam body B with a basic solution.

17. The process of claim 16, wherein the treatment of the metal foam body B with a basic solution is performed for a period in the range from 5 minutes to 8 hours at a temperature in the range from 20 to 120° C., and wherein the basic solution is an aqueous NaOH solution having an NaOH concentration between 2% and 30% by weight.

* * * * *